Sept. 29, 1959  J. E. GARRETT ET AL  2,905,985
SEAL
Filed Sept. 11, 1957

INVENTOR.
JOHN H. GERSTENMAIER
BY   JOHN E. GARRETT

ATTORNEY

United States Patent Office 2,905,985
Patented Sept. 29, 1959

2,905,985
SEAL

John E. Garrett and John H. Gerstenmaier, St. Marys, Ohio, assignors to The Goodyear Tire & Rubber Company, Akron, Ohio, a corporation of Ohio Application September 11, 1957, Serial No. 683,291

1 Claim. (Cl. 20—69)

This invention relates to a resilient seal or gasket and more particularly to a seal to effectively close the joint between a pair of relatively movable members such as railroad refrigerator car doors, warehouse or storage doors.

To effectively seal a joint between relatively movable parts has presented difficulties, particularly for installations which are subjected to relatively severe temperature conditions as well as frequent movement between the parts. Seals of the usual construction take a permanent "set" after a short time so that a major portion of their effectiveness is lost. In the case of refrigerated storage areas such as refrigerator cars or warehouses where temperatures in the zero or sub-zero range are maintained, it is critical to have effective seals around the joints of the openings to prevent undue loss of the cold of the interior to minimize cost of refrigerating as well as spoilage of the contents. The greater the temperature differential between the inside and outside, the more important the effectiveness of the seal becomes. It is therefore an object of this invention to provide a sealing strip that effectively seals the joints between relatively movable parts.

Another object of the invention is to provide a seal that has a substantially longer life than the usual seals.

A further object of the invention is to provide a seal that is constructed to reduce or overcome the effects of the inherent permanent set of the material.

A still further object of the invention is to provide a basic structure that may be adapted to many different types of structures.

Another object of the invention is to provide a seal or gasket that is constructed so as when in use to be constantly urged into sealing relationship.

Other objects and advantages of this invention will appear hereinafter as the description thereof proceeds, the novel features, arrangements and combinations being clearly pointed out in the specification and in the claim thereunto appended.

The gasket of this invention is essentially a U-shaped member formed of resilient material such as rubber, either natural or synthetic, with the outer surface of the bite of the U engaging the surface of one of the members to effect the seal with the ends of the legs of the U attached to the other member to hold the seal in position.

Figure 1:
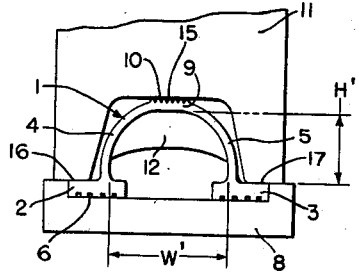
Fig. 1 is a sectional view showing the seal in operation.
Figure 2:
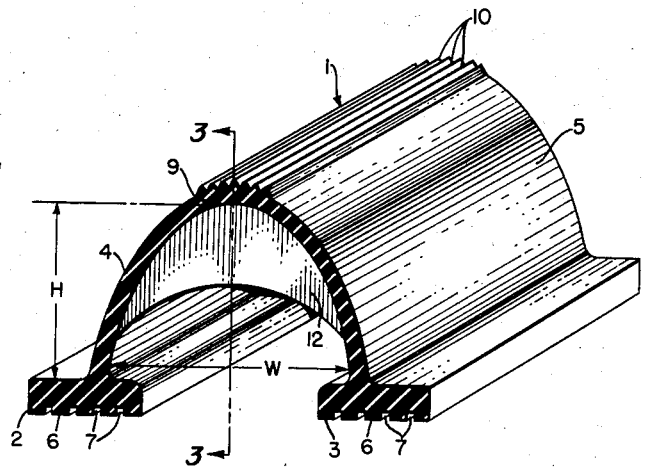
Fig. 2 is perspective sectional view of one form of the invention.
Figure 3:
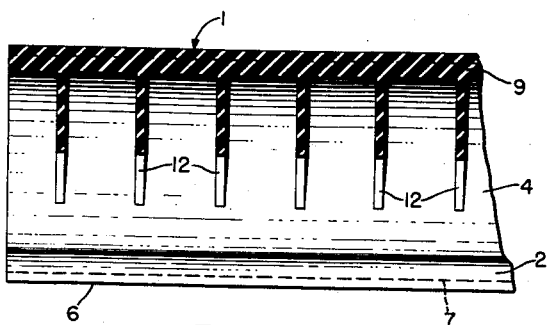
Fig. 3 is a section taken on 3—3 of Fig. 2.

Figs. 2 and 3 illustrate one form of the seal in which the seal 1 is of general U-shaped configuration and includes laterally extending attachment pads 2 and 3 on the ends of the legs 4 and 5 respectively of the U. As shown, the bottom surface 6 of the pads 2 and 3 includes a series of longitudinally extending grooves 7 to assist in effecting a seal between the pads 2 and 3 and the surface of a door stile 8 (Fig. 1) upon installation of the gasket. If desired, an adhesive may be used on the bottom surface 6 to assist in securing the seal 1 to the stile 8. In addition, nails, screws or other fastening means may be used to assist in securing the seal in position on the stile 8.

As shown, a series of longitudinally extending ridges 10 of triangular cross-section are formed on the outer surface of the bite 9 of the seal 1 to permit the seal to intimately engage the contact surface of a sliding door 11. Other surface configurations may be used to form the contact surface of the seal.

Figure 4:
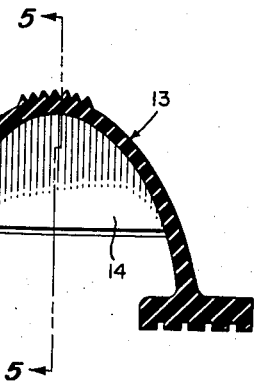
Fig. 4 is an elevation of a modification of the invention.

Interiorly of the U are a series of longitudinally spaced, transverse ribs 12 which extend from the bite of the U toward the open and end thereof and are normal to the length of the seal. The ribs 12 preferably extend at least substantially midway between the bite of the U and the open end thereof with their outer edges either straight as seen in Fig. 4 or arcuately shaped as seen in Fig. 2. The spacing between adjacent ribs may be any desired distance but should be sufficiently close so as to function effectively in the manner intended as hereinafter described.

Figure 5:
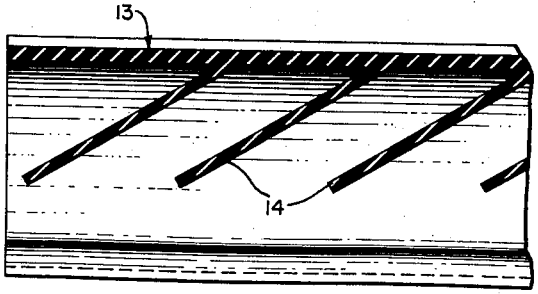
Fig. 5 is a section taken on 5—5 of Fig. 4.

In the modification of the seal 13 as shown in Figs. 4 and 5, the ribs 14 extend transversely across the interior of the seal but are at a substantial angle or oblique to the length of the seal. The angular position of the ribs is such so that the extent of each rib will overlap the extent of the adjacent ribs. The other portions of the seal 13 are similar to those described in connection with seal 1.

Either of the modifications of the seals shown in Figs. 2 and 3 or Figs. 4 and 5 may have the interior ribs at any desired spacing and the shape of the edges may be varied in accordance with the particular requirements. The thickness of the seal and ribs will be determined by the sealing characteristics of the installation but in general, the ribs preferably are relatively thin to prevent undue drawing in of the sides of the seal when it is compressed. The mounting pads on the ends of the legs of the seal are only illustrative of one form that may be used to attach the seal to one of the members. The shape and size of the attaching means will depend upon the details of the structure to which the seal is to be attached and form no part of this invention.

In use, the seal is attached to the door stile 8 as seen in a channel formed therein to fix the lateral spacing of the legs and minimize the possibility of movement during use. The surface 15 of door 11 contacts the ridges 10 on the outer surface of the seal when the door 11 is moved toward the stile 8 to compress the seal therebetween. As seen in Fig. 1, the ends of portions 16 and 17 of the door 11 engage the stile 8 adjacent the seal to limit the movement of door 11 toward the stile 8. When the door is moved into this position the seal is compressed which flattens the seal to cause the sides to bulge or move laterally outwardly from their normal position. This subjects the transverse ribs of the seal to tension which constantly urges the legs of the U toward their normal undeformed condition to increase the pressure of the ribs 10 against the door 11. When the door 11 is opened the seal returns to its normal undeformed shape.

After substantial use the inherent and normal set of rubber under load reduces the effectiveness of the sealing characteristics due to legs of the U not completely reverting to their normal shape. In the particular seal construction shown, the U-shaped seal 1 or 13 in and of itself is subjected primarily to compression when in use, but since the ribs 12 or 14 are subjected to tension, the set that takes place in the U-shaped portion of the seal is counteracted by the tension in the ribs 12 or 14. This not only provides a very effective and lasting seal but also effects a higher sealing pressure initially due to the cumulative effect of the forces of the compression in the legs of the U and the tension of the ribs.

To further minimize the effects of set in the rubber seal, the seal may be formed initially so that the legs are spaced slightly farther apart than the installed position requires. This position for such a seal is indicated by the dotted lines in Fig. 4 and the solid lines indicate the installed position. The seal illustrated in Figs. 2 and 3 may be formed advantageously in a like manner. It is apparent that this slight moving of the legs of the U together during installing will slightly increase the height of the U and relieve any residual tension that might be present in the ribs 12 or 14. The set that then occurs in the seal during repeated use will be effectively neutralized by the initial release of tension that occurs in the ribs when the seal is released.

In Fig. 2, the seal 1 which is uncompressed, has an $H/W$ ratio as determined by its initial dimension, H representing the height of the uncompressed seal and W the width. When the seal is compressed as by use, Fig. 1, the $H'/W'$ ratio is less than that of the seal in Fig. 2, H' representing the height of the compressed seal and W' the width. The tension in the ribs 12 or 14 is constantly urging the sides of the seal 1 or 13 to return to their normal shape thus to the original $H/W$ ratio. The tension in the ribs 12 or 14 supplements the compression that is present in the legs of the seal 1 or 13 to increase the effective sealing pressure of the seal.

While certain representative embodiments and details have been shown for the purpose of illustrating the invention, it will be apparent to those skilled in the art that various changes and modifications may be made therein without departing from the spirit or scope of the invention.

Having thus fully described our invention, what we desire to secure by Letters Patent of the United States is:

A sealing strip for sealing the joint between a pair of relatively movable members comprising an elongated rubber member of substantially U-shape in cross-section to be compressed between the members, the outer surface of the bite of the U engaging one of said members to effect a seal therewith, means adjacent the ends of the legs of the U to attach said rubber member to other of said members, and longitudinally spaced ribs extending transversely between the legs of the U and inclined to the length of the rubber member with the extent of each inclined rib overlapping a portion of the adjacent ribs to distribute the force of compression in the gasket along the entire length thereof, the ribs extending from the bite toward the open end of the U to resiliently urge the rubber member to assume its normal uncompressed position thereby urging the sealing portion of the strip into firm engagement with said member.

References Cited in the file of this patent

UNITED STATES PATENTS

| | | |
|---|---|---|
| 2,041,946 | Nave | May 26, 1936 |
| 2,102,578 | Gail | Dec. 14, 1937 |
| 2,172,458 | Shuart | Sept. 12, 1939 |
| 2,636,228 | Morton | Apr. 28, 1953 |